(12) United States Patent
Auweder et al.

(10) Patent No.: US 10,215,079 B2
(45) Date of Patent: Feb. 26, 2019

(54) THERMOSTATIC VALVE (71) Applicant: MAHLE International GmbH, Stuttgart (DE)

(72) Inventors: Andreas Auweder, Vaihingen/Enz (DE); Juergen Marx, Marbach (DE); Eike Willers, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 253 days.

(21) Appl. No.: 14/953,890

(22) Filed: Nov. 30, 2015

(65) Prior Publication Data

US 2016/0076435 A1 Mar. 17, 2016

Related U.S. Application Data

(63) Continuation of application No. PCT/EP2014/060990, filed on May 27, 2014.

(30) Foreign Application Priority Data

May 28, 2013 (DE) .................. 10 2013 209 965

(51) Int. Cl.
    *F01P 7/02*     (2006.01)
    *F01P 7/16*     (2006.01)
    (Continued)

(52) U.S. Cl.
    CPC ............. *F01P 7/165* (2013.01); *F01P 7/16* (2013.01); *G05D 23/022* (2013.01); *F01P 2003/027* (2013.01); *F01P 2007/146* (2013.01)

(58) Field of Classification Search
    CPC .. F01P 2003/027; F01P 2007/146; F01P 7/16; F01P 7/165; G05D 23/022;
(Continued)

(56) References Cited

U.S. PATENT DOCUMENTS

| | | | | |
|---|---|---|---|---|
| 3,935,998 A | * | 2/1976 | Caldwell | ............. G05D 23/128 236/1 C |
| 6,196,168 B1 | * | 3/2001 | Eckerskorn | ............. F01P 3/20 123/41.33 |

(Continued)

FOREIGN PATENT DOCUMENTS

| | | |
|---|---|---|
| DE | 44 27 340 A1 | 2/1995 |
| DE | 100 00 299 A1 | 7/2001 |

(Continued)

OTHER PUBLICATIONS

English translation of DE10200403748.*

*Primary Examiner* — Ned Landrum
*Assistant Examiner* — Melodee Jefferson
(74) *Attorney, Agent, or Firm* — Muncy, Geissler, Olds & Lowe, P.C.

(57) ABSTRACT

A thermostatic valve for a cooling system of an engine of a motor vehicle, having a thermostatic valve housing, on which a connection to a cylinder head of the engine, a connection to the engine block, a connection to a cooler of the cooling system and at least one connection to a bypass channel are designed, wherein a movable thermostatic operating element, a cooler valve, an engine block valve and a slide for closing the bypass channel are arranged in the thermostatic valve housing. The thermostatic valve has a first slide section is provided for closing a first opening arranged on the thermostatic valve housing and at least one second slide section for closing at least one second opening arranged on the thermostatic valve housing.

11 Claims, 10 Drawing Sheets (51) Int. Cl.
*G05D 23/02* (2006.01)
*F01P 3/02* (2006.01)
*F01P 7/14* (2006.01)

(58) Field of Classification Search
CPC .... G05D 23/02; G05D 23/021; G05D 23/024; G05D 23/025
See application file for complete search history.

(56) References Cited

U.S. PATENT DOCUMENTS

| | | | |
|---|---|---|---|
| 8,091,517 B2 | 1/2012 | Auweder et al. | |
| 8,220,720 B2 | 7/2012 | Auweder et al. | |
| 2002/0043224 A1* | 4/2002 | Richter | F01P 7/167 123/41.1 |
| 2003/0183632 A1* | 10/2003 | Reutter | B60K 15/0406 220/203.23 |
| 2005/0001044 A1* | 1/2005 | Masuko | F01P 7/16 236/101 R |
| 2008/0111092 A1 | 5/2008 | Komurian et al. | |
| 2010/0126598 A1 | 5/2010 | Peric et al. | |
| 2011/0107983 A1* | 5/2011 | Magro | F01N 3/04 123/41.1 |
| 2012/0006286 A1* | 1/2012 | Brinkmann | F01P 11/0285 123/41.08 |

FOREIGN PATENT DOCUMENTS

| | | | |
|---|---|---|---|
| DE | 10 2004 037 488 A1 | 7/2006 | |
| DE | 102004037488 A1 * | 7/2006 | ............. F01P 3/02 |
| DE | 600 26 748 T2 | 4/2007 | |
| DE | 10 2009 017 062 A1 | 10/2010 | |
| EP | 0 431 256 A1 | 6/1991 | |
| EP | 1 024 257 A2 | 8/2000 | |
| EP | 2 021 595 B1 | 4/2010 | |
| EP | 2 019 915 B1 | 12/2010 | |
| GB | 1 376 202 | 12/1974 | |
| JP | S57-97014 | 6/1982 | |
| WO | WO 2008/029029 A1 | 3/2008 | |

* cited by examiner

PRIOR ART

THERMOSTATIC VALVE

This nonprovisional application is a continuation of International Application No. PCT/EP2014/060990, which was filed on May 27, 2014, and which claims priority to German Patent Application No. 10 2013 209 965.7, which was filed in Germany on May 28, 2013, and which are both herein incorporated by reference.

BACKGROUND OF THE INVENTION

Field of the Invention

The present invention relates to a thermostatic valve and a cooling system for a motor vehicle engine.

Description of the Background Art

Thermostatic valves are known in the prior art and are used in a cooling system of a liquid-cooled internal combustion engine to control a coolant circuit with the goal of reaching the optimal temperature in the internal combustion engine as rapidly as possible, to maintain it under all operating conditions, and to prevent overheating in the engine. This is especially important for the operational life, fuel consumption, and exhaust gas production of the internal combustion engine. The thermostatic valve is generally used as a 3/2-way valve in the coolant circuit at a too low engine temperature after startup or at a too low load while the motor vehicle is being driven. Because of the thermostatic valve, the coolant flowing out of the engine flows not through a radiator of the coolant circuit, but directly via a bypass line back again to the engine.

EP 2019915 B1, which corresponds to U.S. Pat. No. 8,220,720, discloses a thermostatic valve for a cooling system of an internal combustion engine, which has a thermostatic operating element disposed in a mixing chamber. The thermostatic drive element acts as a drive element for a main valve element, to be disposed between the mixing chamber and a connection from a coolant radiator, and for two bypass valve elements, which are to be arranged upstream of the mixing chamber and are disposed relative to a valve seat such that upon an extension motion of the thermostatic operating element the initially closed bypass valve element opens and the other closes again due to a slide unit upon a further extension motion. In this case, a common bypass valve element is provided, which has a section acting as the bypass valve slide and a bypass valve disc connected upstream in the extension direction of the thermostatic operating element, a common valve seat being provided between them. Further, a pressure relief valve opening toward the mixing chamber is provided in the common valve seat.

EP 2021595, which corresponds to U.S. Pat. No. 8,091,517, also shows a thermostatic valve for a cooling system of an internal combustion engine with a thermostatic operating element, which is to be disposed in a valve chamber and which acts as a drive element for a main valve element, to be disposed between an engine outlet and a connector leading to a coolant radiator, and for a bypass valve element, which is to be disposed between the engine outlet and an engine inlet, is designed as a valve slide, and has a pressure relief function. It is provided in this case that in addition to the valve slide, the bypass valve element is provided with a valve disc which is assigned to the valve slide in the extension direction of the thermostatic operating element. Further, a component, which forms both a valve seat for the valve slide and a valve seat for the valve disc, is assigned to the valve slide and the valve disc.

SUMMARY OF THE INVENTION

It is therefore an object of the invention to develop further a thermostatic valve. The thermostatic valve to be developed should have a simple structure and be usable in a limited installation space.

An exemplary embodiment of the invention provides a thermostatic valve for a cooling system of a motor vehicle engine, the valve has a thermostatic valve housing on which a connection to a cylinder head of the engine, a connection to an engine block, a connection to a radiator of the cooling system, and at least one connection to a bypass channel are formed, whereby a movable thermostatic operating element, a radiator valve, an engine block valve, and a slide for closing the bypass channel are disposed in the thermostatic valve housing, whereby a first slide section for closing a first opening, arranged on the thermostatic valve housing, and at least one second slide section for closing at least one second opening, arranged on the thermostatic valve housing, are provided. The first and second openings can be located in the area of the bypass channel and connect it to a thermostatic valve interior, which can be surrounded by the thermostatic valve housing. In the interaction of the first and second slide section, thus the first and second opening in the thermostatic valve housing and therefore the connection to the bypass channel can be closed at least in sections. The cooling system can be a split cooling system for engine inlet regulation and/or for engine outlet regulation, for example, for an internal combustion engine. A split cooling system in each case can have a separate cooling circuit for the engine block and the cylinder head. In the case of engine inlet regulation, the connection is provided to the cylinder head and to the engine block and from the coolant radiator and from the bypass channel. In the case of engine outlet regulation, the connection can be provided from the cylinder head and from the engine block and to the coolant radiator and to the bypass channel. The bypass channel can also be called a 'short-circuit channel'. A thermostatic operating element, which has an expansion element, for example, an expanding wax element, can be disposed in the thermostatic valve. The expansion element, located in the interior of the operating element, can be surrounded by outflowing coolant and has a working piston, movable as a function of temperature. In particular, when a set temperature is exceeded, valve discs, operatively connected to the working piston, and/or slides can be opened or closed. Thus, a mixture of bypass and coolant radiator fluid can form in the engine. The thermostatic valve can be continuously open only when still hot coolant fluid arrives. Optimal cooling of the engine can be assured in this way and a sudden cooling-off of one or more cylinders of the engine can be prevented. Thus, an advantage of the thermostatic valve according to an exemplary embodiment of the invention is that a single thermostatic valve was provided for a split cooling system. The valve can replace the function of the two coolant thermostats used so far, each of which can be connected to a coolant subcircuit of the cylinder head and a coolant subcircuit of the engine block. It is thereby made possible in a limited installation space to close a suitable bypass area of the bypass connection with an opening in the thermostatic valve.

In an embodiment of the thermostatic valve, the first and at least second openings, when viewed in a longitudinal extension direction of the thermostatic valve housing, can be arranged at different heights of the thermostatic valve housing. The first and at least second openings thus form at least two cascade-like openings. This is advantageous because the required flow volume can be achieved with an invariably small adjusting stroke of the slide. Thus, a very compact design can be realized and the thermostatic valve can be used in a narrow installation space in a motor vehicle engine compartment. More than two openings can also be provided, whereby the corresponding number of slide sections must then be formed.

In an embodiment of the thermostatic valve, the slide has at least one slide aperture. The slide aperture in a slide, otherwise made as a single piece, realizes the first and second slide section. The slide aperture can have different geometric designs, which in turn result in a different geometry of the first and second slide section. The first and second openings, formed on the thermostatic valve housing, can be designed as slot-shaped. In this case, the first and second slide sections then have a substantially rectangular shape. The first and second openings in the thermostatic valve housing can also have a round, elliptical, or some other shape. The shape of the openings, however, can be designed so that at least one control edge can be formed at each opening. The closing of the first and/or second opening can occur by means of the control edge via the respective control edge, for example, in a parallel manner. Two or more slide apertures can also be provided, which then form three or more slide sections by which the three or more openings can be closed.

A pressure relief valve can be provided in an embodiment of the thermostatic valve. A pressure-dependent opening in the thermostatic valve can be realized, for example, by the pressure relief valve. In an embodiment, the pressure relief valve can be integrated into the engine block valve or the engine block connection. It becomes possible hereby to create a pressure-dependent opening, in addition to temperature-dependent opening, by means of the thermostatic operating element in a structurally simpler and more compact design. This is advantageous at cold engine temperatures in order to achieve flow of the cooling medium from the connection to the engine block via the two openings on the thermostatic valve housing to the bypass channel.

The thermostatic valve can have a first return spring assigned to the radiator valve, a second return spring assigned to the engine block valve, and/or a third return spring assigned to the pressure relief valve. The return springs can each create a restoring force for the valve disc of the particular valve.

Further, other connections, by means of which a heating heat exchanger and/or an equalizing tank can be connected to the thermostatic valve, can be formed on the thermostatic valve housing The object is also achieved by means of a cooling system for a motor vehicle engine, particularly an internal combustion engine, in which a thermostatic valve of the invention is provided, which is disposed in each case between a connection to an engine block, a cylinder head, a bypass channel, and a coolant radiator of the cooling system.

A cooling system is also provided, in which a cooling medium circulates, with the thermostatic valve of the invention enables a method for cooling an engine block of an internal combustion engine, in which method different valves in the thermostatic valve can be opened depending on the particular temperature of the media, whereby an engine block valve can be opened at a rising temperature in a first step. If the temperature continues to rise, a radiator valve can be opened in addition, so that the engine can be operated in the mixed mode, whereby the first and second openings on the thermostatic valve housing are successively closed via the slide. As a result, coolant flow can occur via the coolant radiator connection to the engine block and to the cylinder head. The method can proceed by means of the thermostatic operating element of the thermostatic valve, which changes a position of the slide with a first and second slide section and thereby closes at least in sections the at least two openings on the thermostatic valve housing. The at least two cascade-like openings can be, for example, configured such that the closing of the at least two openings occurs substantially parallel and substantially simultaneously or simultaneously via control edges in the slide. As a result, the two openings can be closed synchronously, either completely or in sections. The split cooling system can manage with only one thermostatic valve instead of the two thermostatic valve used thus far and is thereby more economic and cost-effective to manufacture. It is advantageous hereby in addition that less coolant needs to be used in the cooling system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Thermostatic valves 10, 44, 100, shown in FIGS. 1 to 5, are shown in a sectional view, whereby the cut is made in each case along a longitudinal extension direction 12 of the particular thermostatic valve 10, 44 and 100.

Figure 1:
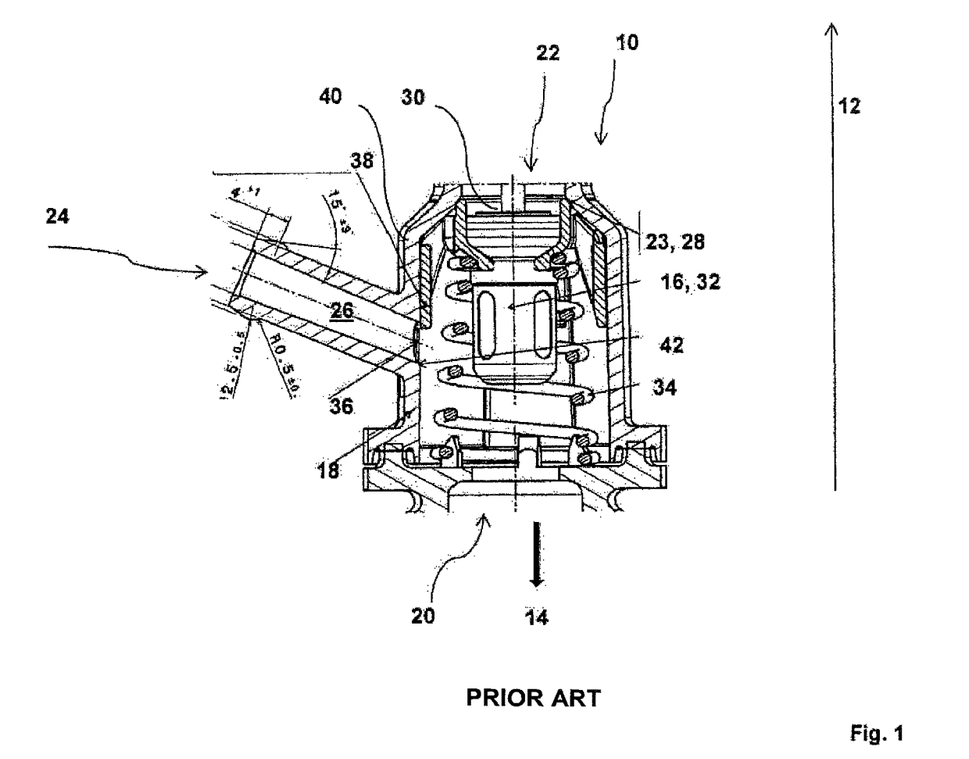
FIG. 1 and FIG. 1a show a thermostatic valve according to the prior art.
Figure 1A:
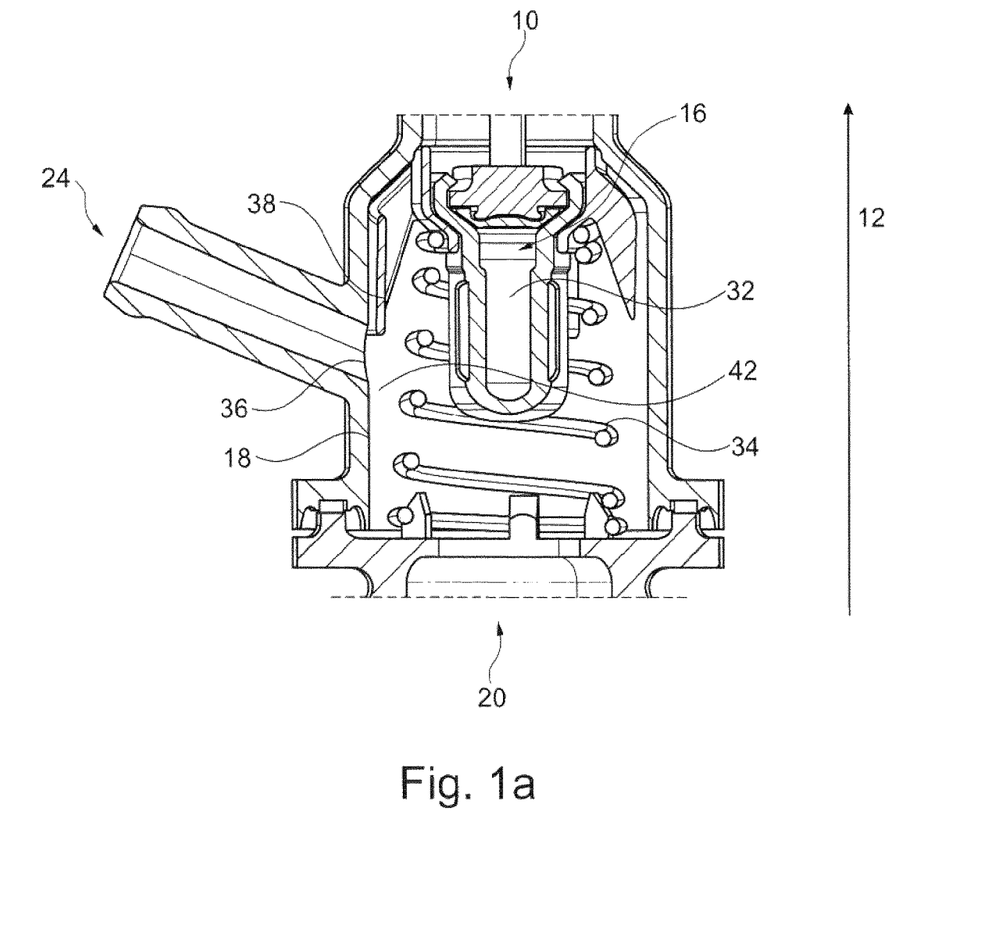

FIG. 1 shows thermostatic valve 10 according to the prior art. A thermostatic operating element 16 disposed in a thermostatic valve housing 18 is provided in thermostatic valve 10. A first connection 20 to an engine block (not shown), which is called the engine block connection 20 below, is formed on thermostatic valve housing 18. Further, thermostatic valve housing 18 has a connection 22 to a coolant radiator (not shown), which is called a coolant radiator connection 22 or radiator connection 22. A third connection 24 is used for connecting to a bypass channel 26 and is called bypass channel connection 24. Thermostatic valve 10 further has a radiator valve 28 with a valve disc 30, via which coolant radiator connection 22 can be closed. Thermostatic operating element 16 has an expansion element 32 and is movable in an extension direction 92 or in longitudinal extension direction 12, if expansion element 32 expands. Expansion element 32 can be, for example, an expanding wax element 32 and has a wax mixture. Thermostatic valve 10 further has a return spring 34 for displacing valve disc 30 and thereby for closing coolant radiator connection 22. An opening 36, closable by means of a slide 38, is arranged between bypass channel 26 and housing 18. Slide 38 when the bypass channel is open is disposed substantially parallel to a wall section 40 of housing 18. In the closed state, slide 38 is pushed downward parallel in extension direction 14 up a control edge 42, so that slide 38 is disposed before opening 36 and between wall section 40 and control edge 42. FIG. 1a shows thermostatic valve 10 according to the prior art in a different sectional plane along longitudinal extension direction 12, in which the expansion element 32 is visible. Identical items are designated with the same reference characters.

Figure 2:
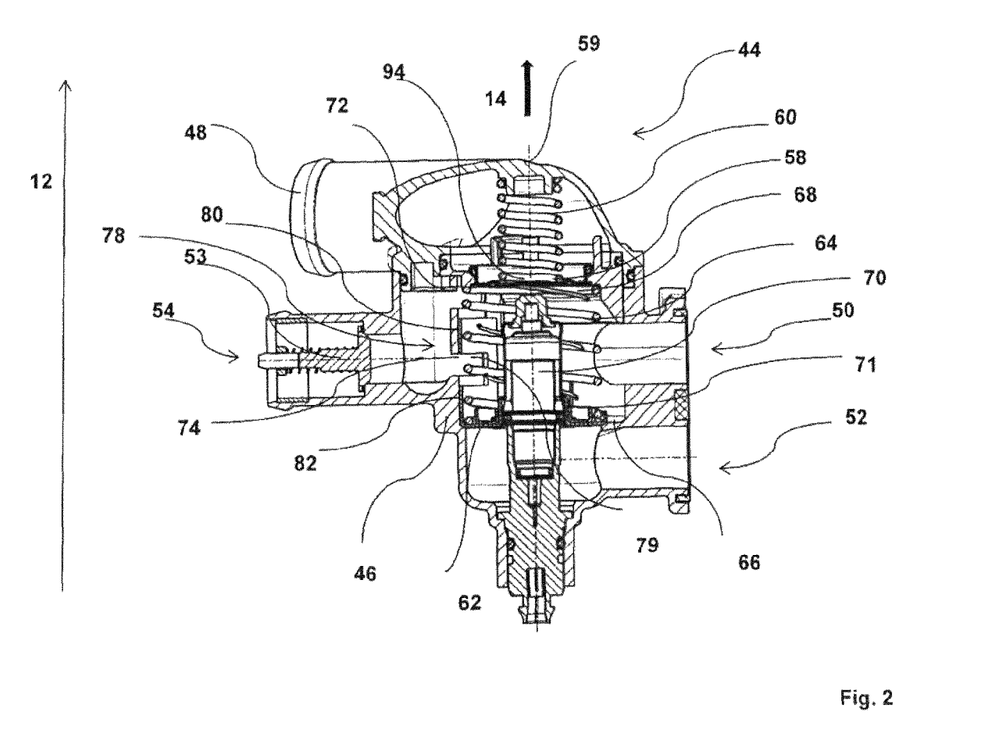
FIG. 2 and FIG. 2a show a thermostatic valve of the invention in a first embodiment in a first operating state.

FIG. 2 shows a first exemplary embodiment of a thermostatic valve 44 of the invention. Thermostatic valve 44 is in a first operating state which has a stroke of 0 mm. Thermostatic valve 44 has a thermostatic valve housing 46 on which a connection 48, called a radiator coolant connection 48, is formed on housing section 59 for connecting to a coolant radiator (not shown). Another connection 50 formed on thermostatic valve housing 46 can be connected to a cylinder head (not shown) and is called cylinder head connection 50. An engine block connection 52 can be connected to an engine block (not shown). A bypass connection 54, which can be connected to a bypass channel (not shown) and in which a bypass valve 53 is disposed, is disposed on the opposite side of thermostatic valve housing 46 when viewed rotationally symmetrically. Bypass valve 53 is closed in the operating state shown in FIG. 2.

Figure 2A:
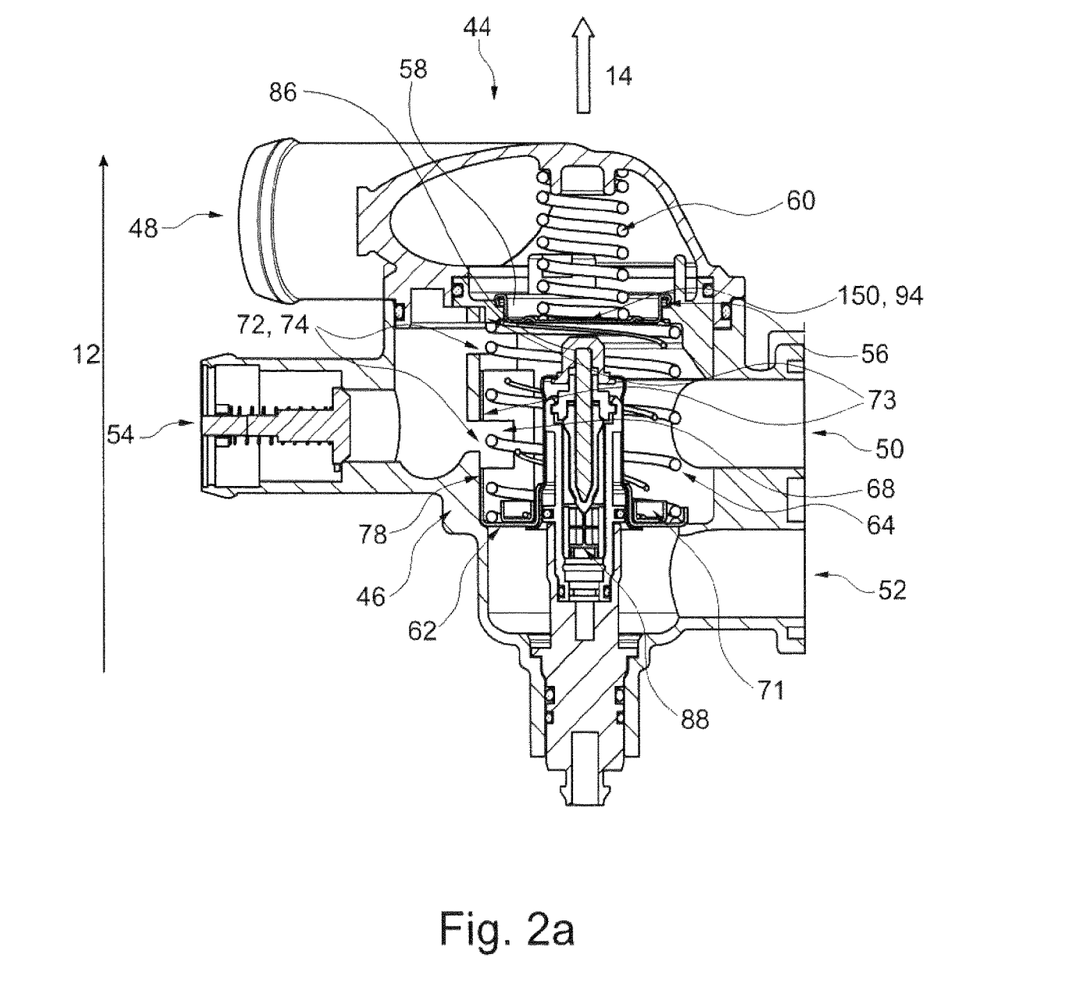

Further, a coolant radiator valve 56 or radiator valve 56 with a radiator valve disc 58 for closing radiator coolant connection 48, which is operatively connected to a second return spring 60, which is supported against a housing section 59 of radiator coolant connection 48, is disposed in thermostatic valve housing 46. Radiator valve disc 58 can open against second return spring 60. Further, an engine block valve 62 and a first return spring 64, which is supported on a component 66 connected to thermostatic valve housing 46 and is operatively connected to engine block valve 62, are disposed in thermostatic valve housing 46. A third return spring 68 is disposed rotationally symmetrically around a thermostatic operating element 70 with an expansion element 88 (shown in FIG. 2a). Further, a pressure relief valve 71 is disposed in thermostatic valve housing 46. As shown in FIGS. 2 and 2a, the pressure relieve valve 71 surrounds an outer circumference of the thermostatic operating element 70.

Bypass connection 54 has a first opening 72 and a second opening 74, which are separated from a housing element 76. First and second openings 72, 74 can each be closed by means of a slide 78 with a first slide section 80 and a second slide section 82 in that first slide section 80 is moved in front of first opening 72 and second slide section 82 in front of second opening 74. First slide section 80 and second slide section 82 are formed in that in the area of bypass connection 54 a slide aperture 79 is disposed on slide 78 in such a way that first slide section 80 and second slide section 82 are formed. The operating state shown in FIG. 2 shows an opened bypass connection 54, in which first and second slide section 80, 82 are each disposed outside first and second opening 72, 74, parallel or substantially parallel to a wall section 40 of thermostatic valve housing 46. Coolant can flow through openings 72, 74.

FIG. 2a shows thermostatic valve 44 of FIG. 2, whereby thermostatic operating element 70 is shown in a sectional view along longitudinal extension direction 12. Thermostatic operating element 70 has a housing 84 with a cover-like section 86. An expansion element 88, for example, a wax element having a wax mixture is disposed in housing 84. This type of expansion element 88 is also called an expanding wax element 88. The expanding material, particularly the wax, changes its volume as a function of temperature and with a suitable rise in temperature drives a working piston 90 out of housing 84. In the course of its extension, working piston 90 can take along slide 78 and shift it in its position. Thus, bypass connection 54 can be closed at least partially. Moreover, working piston 90 can also change the position of radiator valve disc 58 and engine block valve 62. The operation of thermostatic operating element 70 is explained after the description of FIGS. 2 to 5 for the first embodiment and the second embodiment of thermostatic valve 44, 100.

Figure 3:
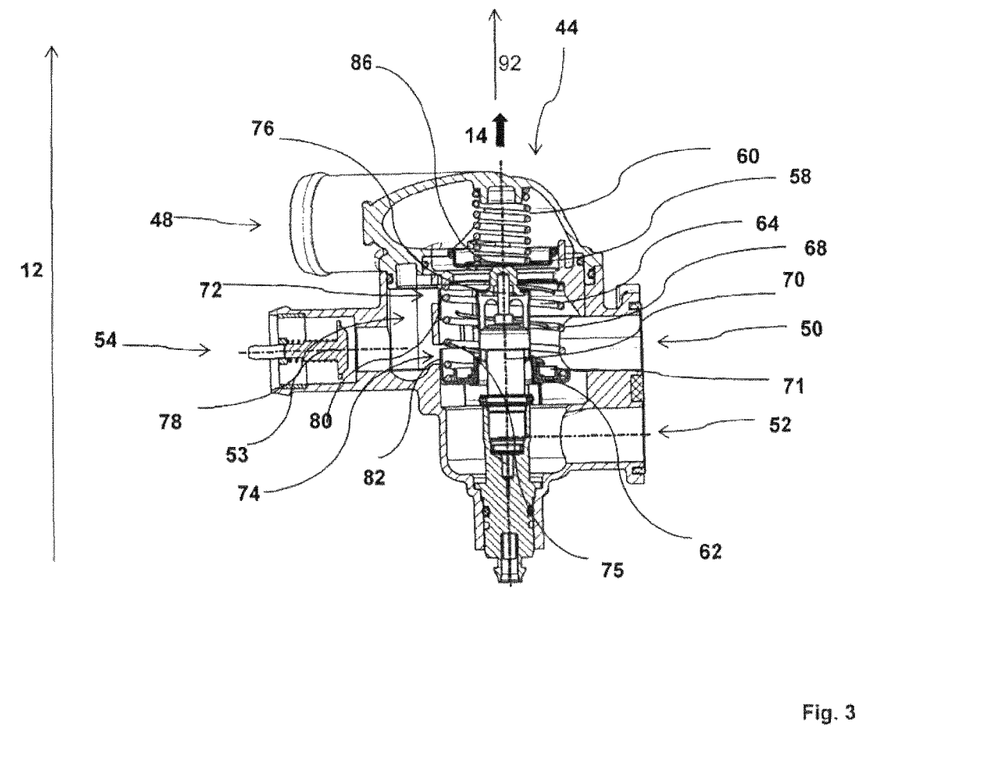
FIG. 3 and FIG. 3a show the thermostatic valve of FIGS. 2 and 2a according to the invention in a second operating state.

FIG. 3 shows the first example of thermostatic valve 44 of the invention in a second operating state with a stroke of about 5 mm. Identical items in FIGS. 2, 2a 3, 3a, 4, and 5 are given the same reference characters. In contrast to the illustration in FIGS. 2 and 2a, slide 78 is moved in extension direction 92 of operating element 70 and first slide section 80 closes opening 72, and second slide section 82 closes opening 74 of bypass connection 54. Bypass valve 53 is opened at least in sections in the second operating state.

Figure 3A:
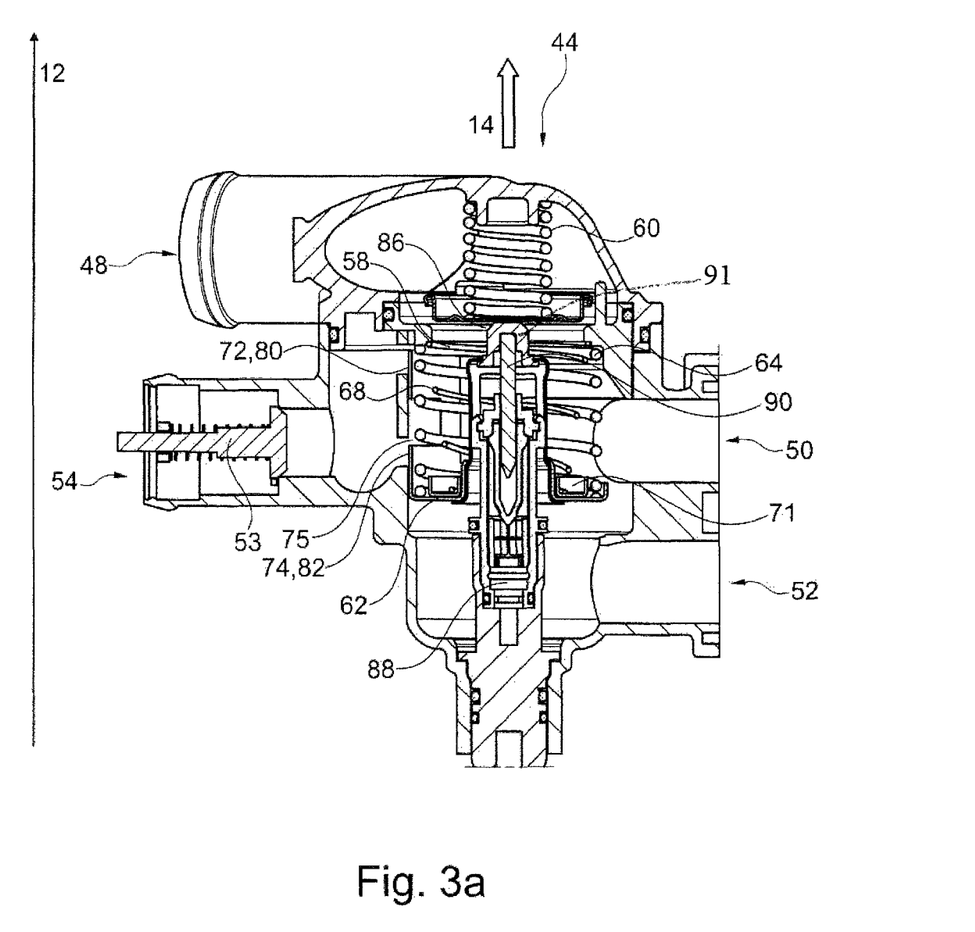

FIG. 3a shows thermostatic valve 44 likewise in the second operating state like FIG. 3, whereby the position of operating element 70 is made clearer and expansion element 88 and working piston 90 are visible.

Figure 4:
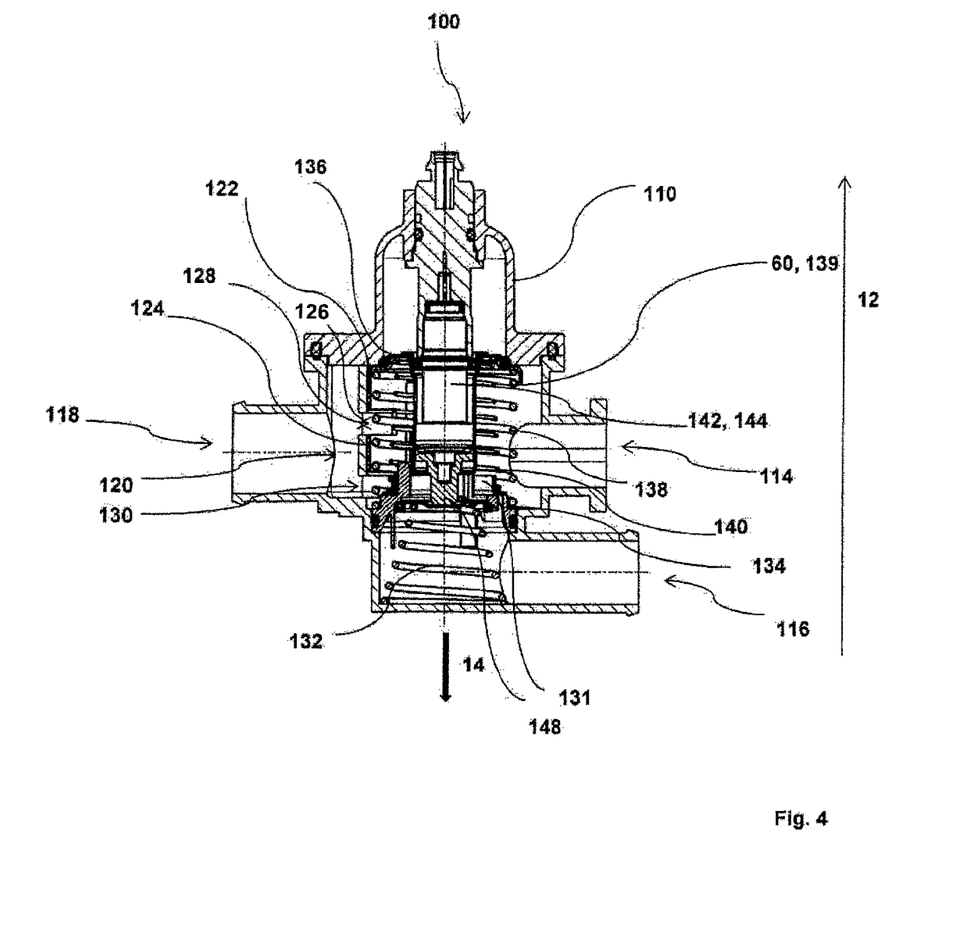
FIG. 4 and FIG. 4a show a further exemplary embodiment of a thermostatic valve of the invention in a first operating state.

FIG. 4 shows a second example of thermostatic valve 100 of the invention. Thermostatic valve 100 has a thermostatic valve housing 110 on which a connection 112 for a coolant radiator (not shown) is disposed, which is called radiator connection 112. Further, a cylinder head connection 114 for connecting from or to the connection to a cylinder head (not shown) and an engine block connection 116 for connecting to an engine block (not shown) and a bypass connection 118 for connecting to a bypass channel (not shown) are provided. Bypass connection 118 can be closed with a slide 120, which has a first slide section 122 and a second slide section 124, which are realized by an aperture 126 on slide 120 and are configured such that first slide section 122 can close a first opening 128 and second slide section 124 can close a second opening 130. In this case, first opening 128 and second opening 130 form cascade-like openings, which are arranged geodetically below one another on a vertical axis 132 of thermostatic valve 100. It can also be provided to arrange the first and second openings 128, 130 offset to one another along vertical axis 132.

Further, an engine block valve 134 and a radiator valve 136 are disposed in thermostatic valve housing 110. Engine block valve 134 is operatively connected to a first return spring 138 and radiator valve 134 is operatively connected to a second return spring 139. Further, a third return spring 140 is provided which is operatively connected to a pressure relief valve 131. Pressure relief valve 131 is placed, for example, in the immediate vicinity of engine block valve 134 or is integrated into said valve. A thermostatic operating element 142 with an expansion element 144 (shown in FIG. 4a) and a working piston 146 and a driver 148 is placed centrally, for example, on axis 132 in thermostatic valve housing 110 and has the function of controlling valves 134 and 136 and slide 120 as a function of temperature. This can be realized because the volume of expansion element 144 can be influenced by the temperature and thereby the position of working piston 146 and driver 148 can be changed.

Figure 4A:
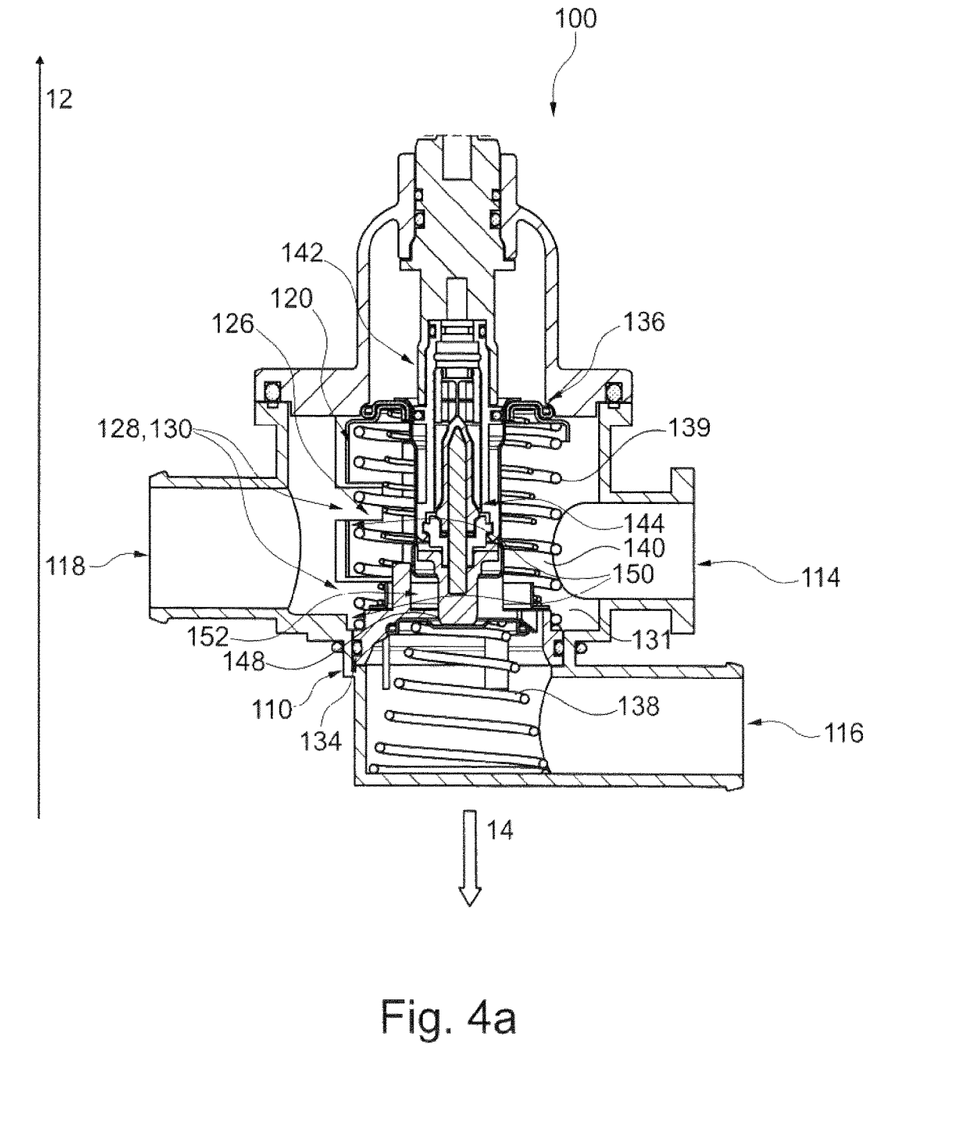

FIG. 4a shows the second embodiment of thermostatic valve 100 of FIG. 4. Identical items are labeled with the same reference character. Expansion element 144 and working piston 146, which cannot be seen in the illustration of FIG. 4, as well as driver 148 are shown in the sectional view.

Figure 5:
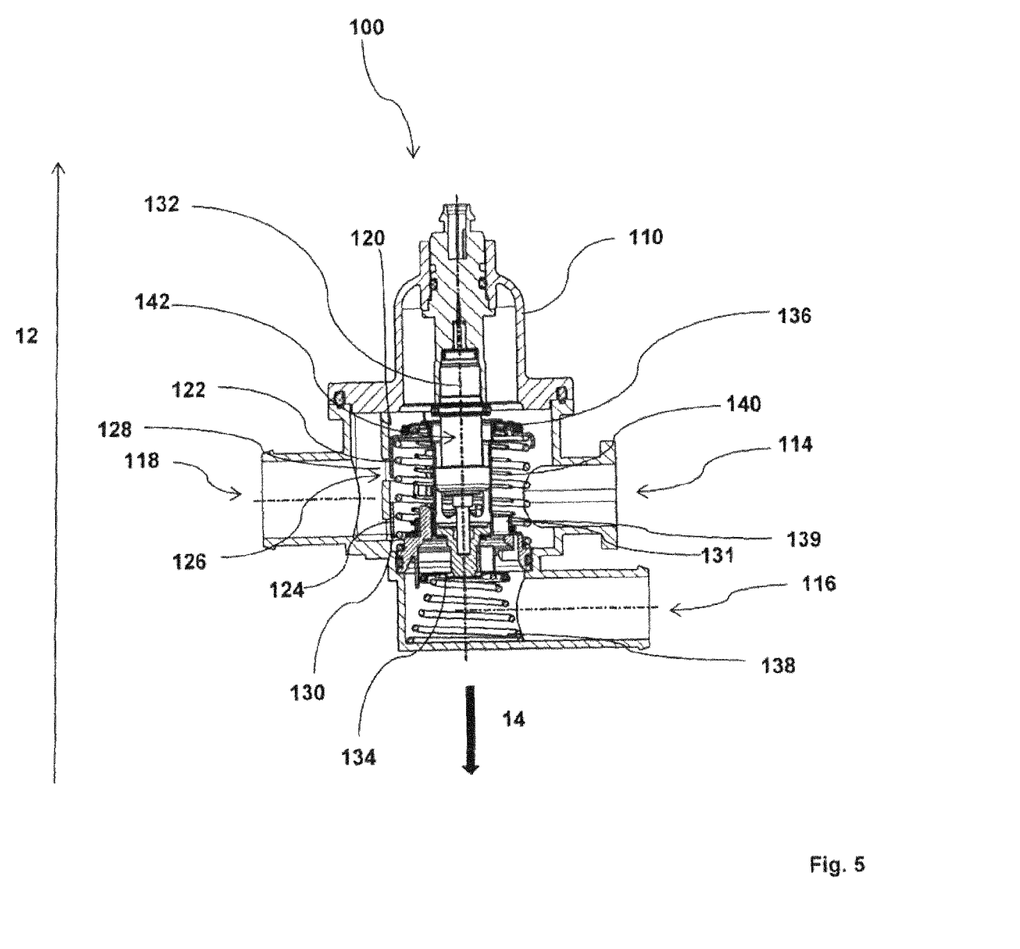
FIG. 5 and FIG. 5a show the thermostatic valve of FIGS. 4 and 4a in a second operating state.
Figure 5A:
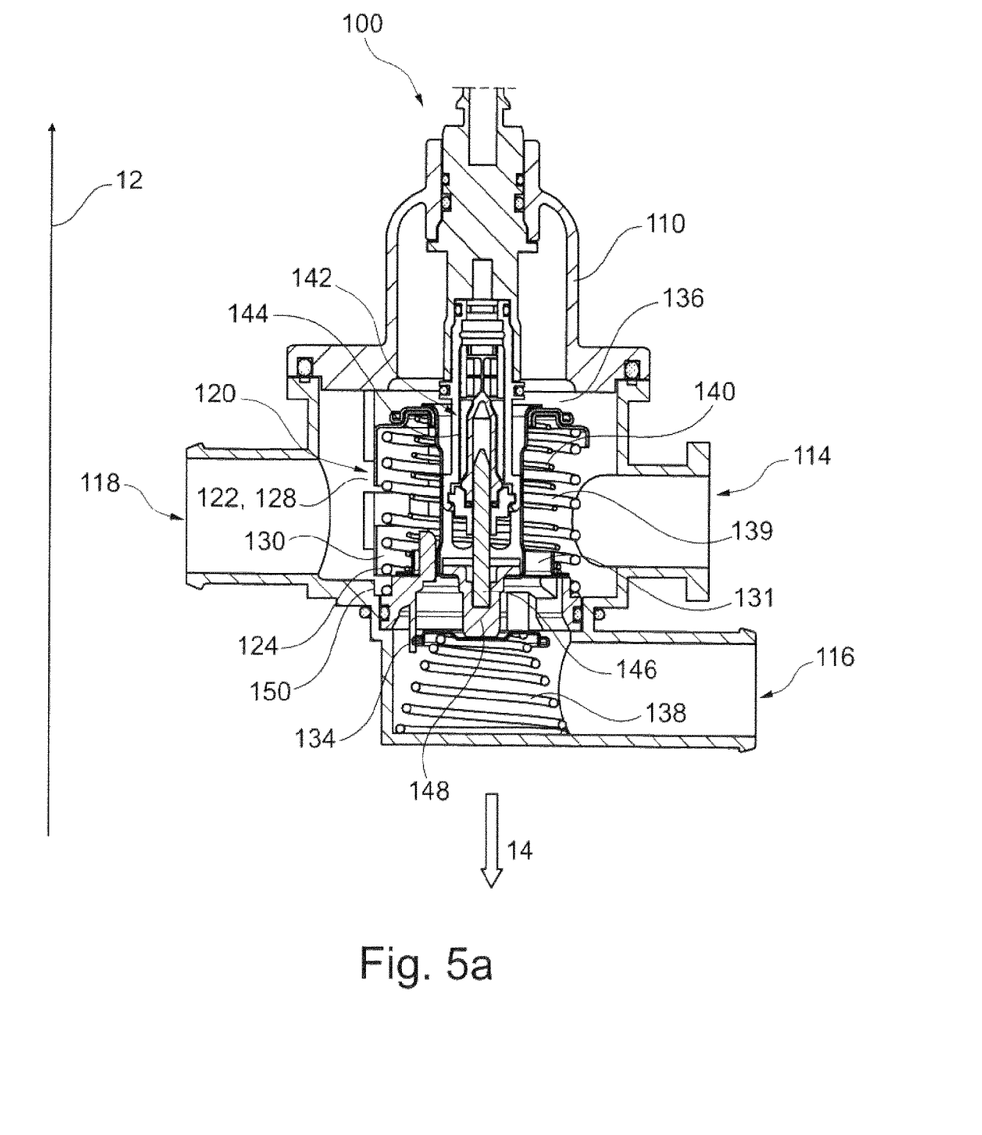

FIG. 5 shows thermostatic valve 100 in a second operating state, in which there is a different, higher temperature at which the volume of expansion material element 144 is increased, as a result of which working piston 146 is extended and the positions of slide 120, engine block valve 134, and radiator valve 136 are shifted relative to thermostatic valve housing 110. The shift occurs hereby opposite to the direction of longitudinal extension direction 12 of thermostatic valve 100.

It can be provided in both embodiments of thermostatic valve 44 and 100 to dispose thermostatic operating element 70, 142 and/or expansion element 88, 144 in a position offset by 180° in thermostatic valve housing 46, 110.

The function and operation of thermostatic valves 44 and 100 will be explained below. The reference characters in each case indicate the first and second embodiment, whereby the reference characters of the items of the first embodiment are always given first.

The starting situation is a cold engine, for example, an internal combustion engine. In the case of a cold engine, radiator coolant connection 48, or 112, and engine block connection 52 or 116 are closed by radiator valve 56 or 136 and engine block valve 62 or 134. This occurs in that second return springs 60 or 139 and first return springs 64 or 138 exert a restoring force on the particular valves 56, 136 and 62, 134. Cylinder head connection 50, 114 and bypass connection 54, 118 are open and the cooling medium can reach the cylinder head. With a rising temperature of the cooling medium in the cylinder head, first engine block valve 62, 134 is opened by means of working piston 90, 146 and of driver 91, 148 of thermostatic operating element 70, 142. With a further rising temperature of the cooling medium, radiator valve 56, 136 is opened after a return stroke 94, 150 in each case against second return spring 60, 139. As a result, the cooling medium can reach the engine block and the cylinder head via bypass connection 54, 118 and via radiator coolant connection 48, 112. The engine is operated in the mixed mode. First opening 72, 128 and second opening 74, 130 in thermostatic valve housing 46, 110 are closed simultaneously at least in sections by means of first slide section 80, 122 and of second slide section 82, 124 of slide 78, 120. The closing of first and second opening 72, 128 and 74, 130 occurs stepwise in this case depending on the cooling medium temperature present until with a rising temperature, openings 72, 128 and 74, 130 are completely closed via control edges 75 and 152. If openings 72, 74 or 128, 130 are completely closed, flow of the cooling medium to the engine block and the cylinder head can occur only via radiator coolant connection 48, 112. The engine is operated in the radiator mode.

If the temperature drops, radiator valve 56, 136 is closed by second return spring 60, 139 and simultaneously first opening 72, 128 and second opening 74, 130 are opened at least in sections by the extension of first slide section 80, 122 and of second slide section 82, 124. Next, engine block valve 62, 134 is closed. The flow of the cooling medium can occur only via cylinder head connection 50, 114 and via bypass connection 54, 118. In this case, the closing and opening of the particular valves occurs via an interaction of the first and second return springs and thermostatic operating element 70, 142, whose expansion element 88, 144 expands with a rising temperature and contracts with a falling temperature. In addition to engine block valve 62, 134, radiator valve 56, 136, and slide 78, 120, which are controlled by thermostatic operating element 70, 142, a pressure relief valve 71 and 131 can be used in each case, which enables a pressure-dependent opening, which enables, particularly in the case of cold engine temperatures, a flow of the cooling medium from engine block connection 52, 116 via first and second opening 72, 128 and 74, 130 into the bypass channel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A thermostatic valve for a cooling system of a motor vehicle engine, the thermostatic valve comprising:
   a thermostatic valve housing on which a cylinder head connection to a cylinder head of the motor vehicle engine, an engine block connection to an engine block, a radiator connection to a radiator of the cooling system, and at least one bypass channel connection to a bypass channel are formed,
   a movable thermostatic operating element, a radiator valve, an engine block valve, a pressure relief valve and a slide for closing the bypass channel are disposed in the thermostatic valve housing;
   wherein the slide includes:
      a first slide section for closing a first opening arranged on the thermostatic valve housing; and
      at least one second slide section for closing at least one second opening arranged on the thermostatic valve housing,
   wherein the pressure relief valve surrounds an outer circumference of the movable thermostatic operating element, and
   wherein the pressure relief valve is discrete from the slide.

2. The thermostatic valve according to claim 1, wherein the movable thermostatic operating element in the thermostatic valve housing has an expansion element or an expanding wax element, and a working piston.

3. The thermostatic valve according to claim 1, wherein, when viewed in a longitudinal extension direction of the thermostatic valve housing, the first opening is located at a different height of the thermostatic valve housing than the at least one second opening.

4. The thermostatic valve according to claim 1, wherein the slide has at least one slide aperture.

5. The thermostatic valve according to claim 1, wherein the first opening and/or the at least one second opening are formed slot-shaped.

6. The thermostatic valve according to claim 1, wherein the pressure relief valve is integrated into the engine block valve.

7. The thermostatic valve according to claim 1, wherein a first return spring assigned to the engine block valve, a second return spring assigned to the radiator valve, and a third return spring assigned to the pressure relief valve are provided.

8. A cooling system for a motor vehicle engine, particularly an internal combustion engine, the cooling system comprising:
a thermostatic valve according to claim 1, the thermostatic valve being disposed between a connection of an engine block, a coolant radiator of the cooling system, a connection of a cylinder head, and a bypass channel.

9. The thermostatic valve according to claim 1, wherein the cylinder head connection and the engine block connection are provided on an opposite side of the thermostatic valve housing as the at least one bypass channel connection, and wherein the cylinder head connection and the engine block connection are provided on a same side of the thermostatic valve housing.

10. The thermostatic valve according to claim 1, wherein a bypass valve is provided in the bypass channel.

11. A thermostatic valve for a cooling system of a motor vehicle engine, the thermostatic valve comprising:
a thermostatic valve housing on which a cylinder head connection to a cylinder head of the motor vehicle engine, an engine block connection to an engine block, a radiator connection to a radiator of the cooling system, and at least one bypass channel connection to a bypass channel are formed,
a movable thermostatic operating element, a radiator valve, an engine block valve, a pressure relief valve and a slide for closing the bypass channel are disposed in the thermostatic valve housing;
a first slide section for closing a first opening arranged on the thermostatic valve housing; and
at least one second slide section for closing at least one second opening arranged on the thermostatic valve housing,
wherein the pressure relief valve surrounds an outer circumference of the movable thermostatic operating element,
wherein a first return spring assigned to the engine block valve, a second return spring assigned to the radiator valve, and a third return spring assigned to the pressure relief valve are provided, and
wherein the first return spring directly contacts the engine block valve, the second return spring directly contacts the radiator valve and the third return spring directly contacts the pressure relief valve.

* * * * *